No. 790,592. PATENTED MAY 23, 1905.
E. T. ROBINSON & H. WITTE.
CONVERTIBLE CAR.
APPLICATION FILED JAN. 3, 1905.
11 SHEETS—SHEET 1.
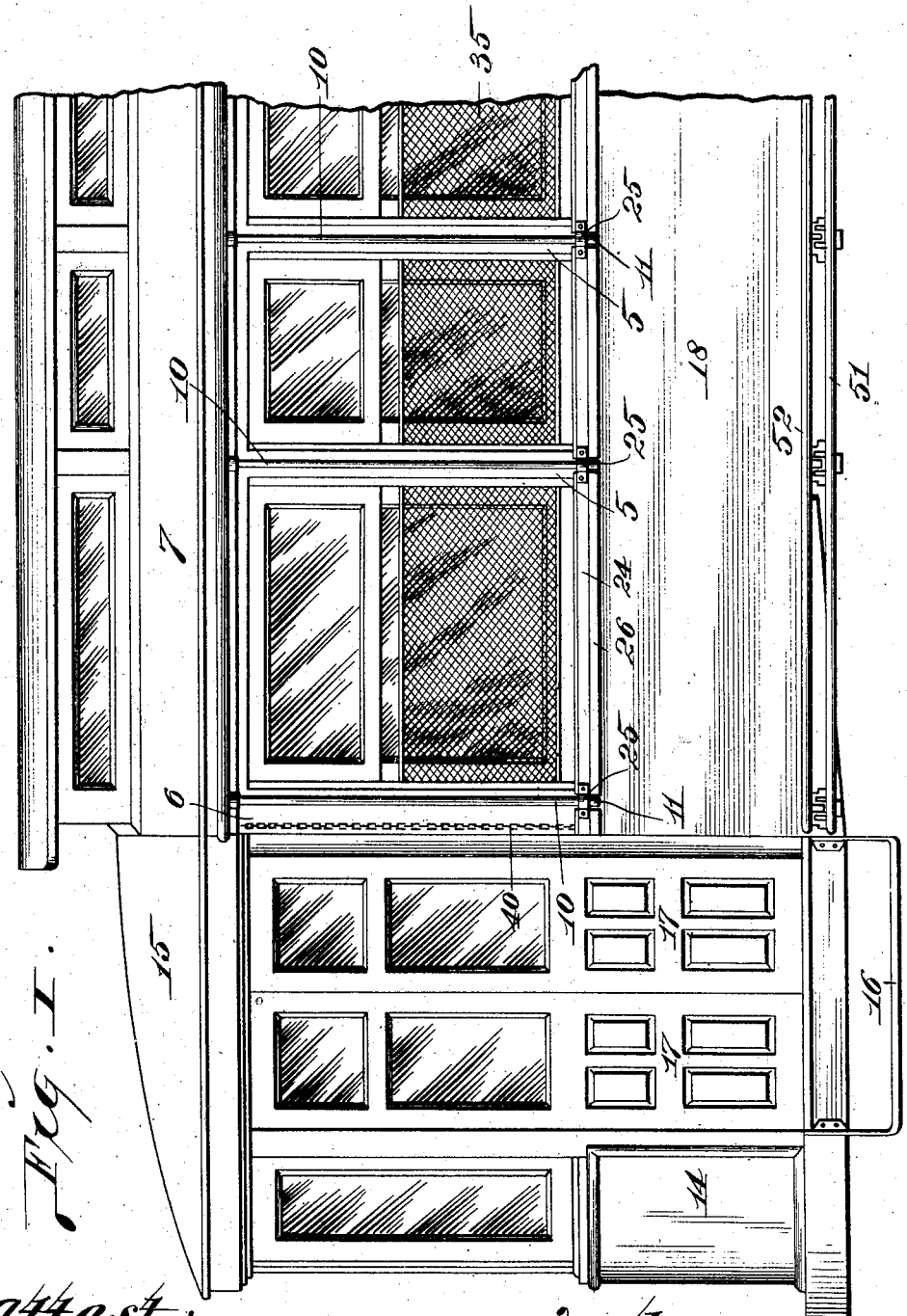

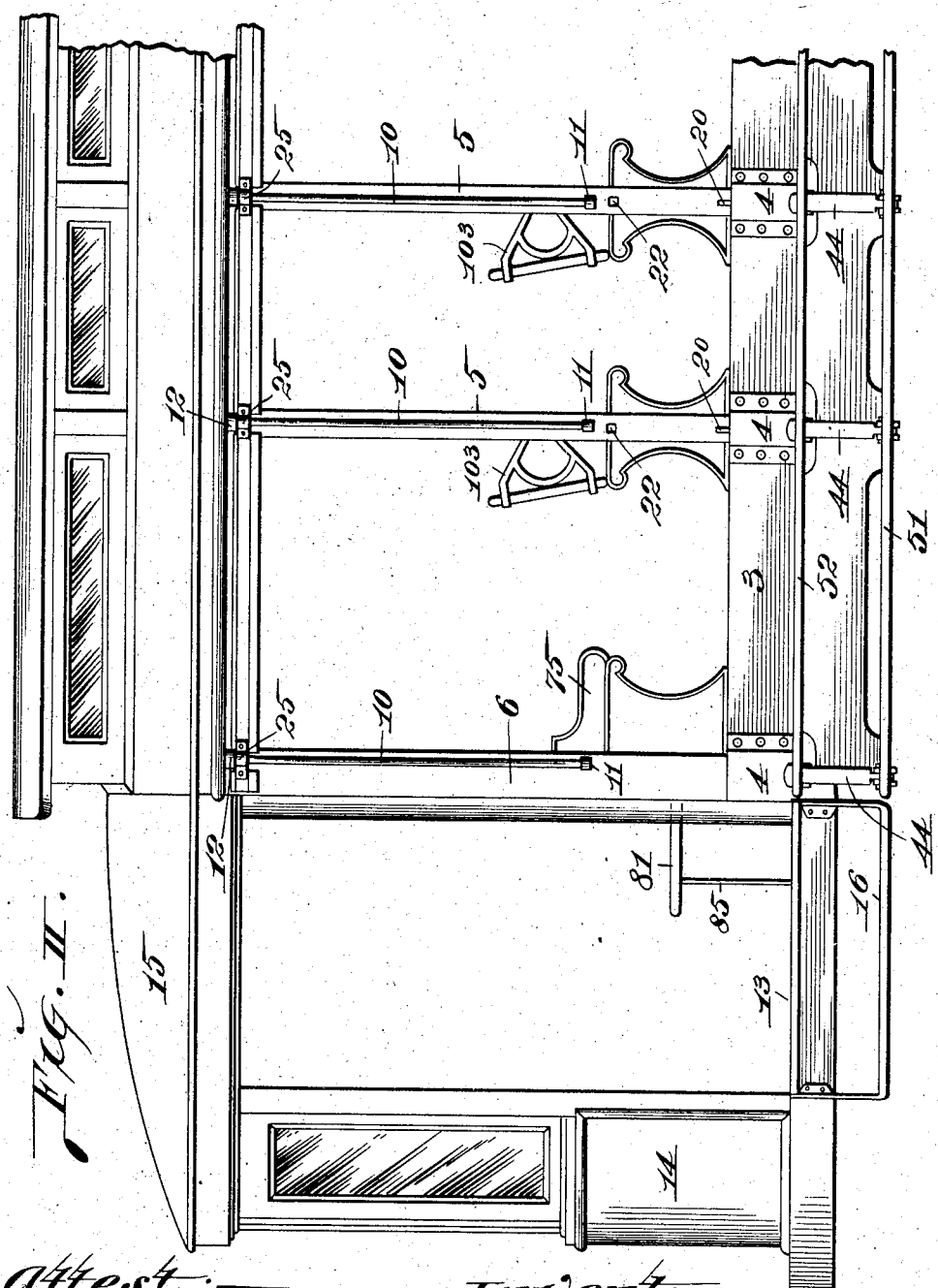

No. 790,592. PATENTED MAY 23, 1905.
E. T. ROBINSON & H. WITTE.
CONVERTIBLE CAR.
APPLICATION FILED JAN. 3, 1905.
11 SHEETS—SHEET 3.
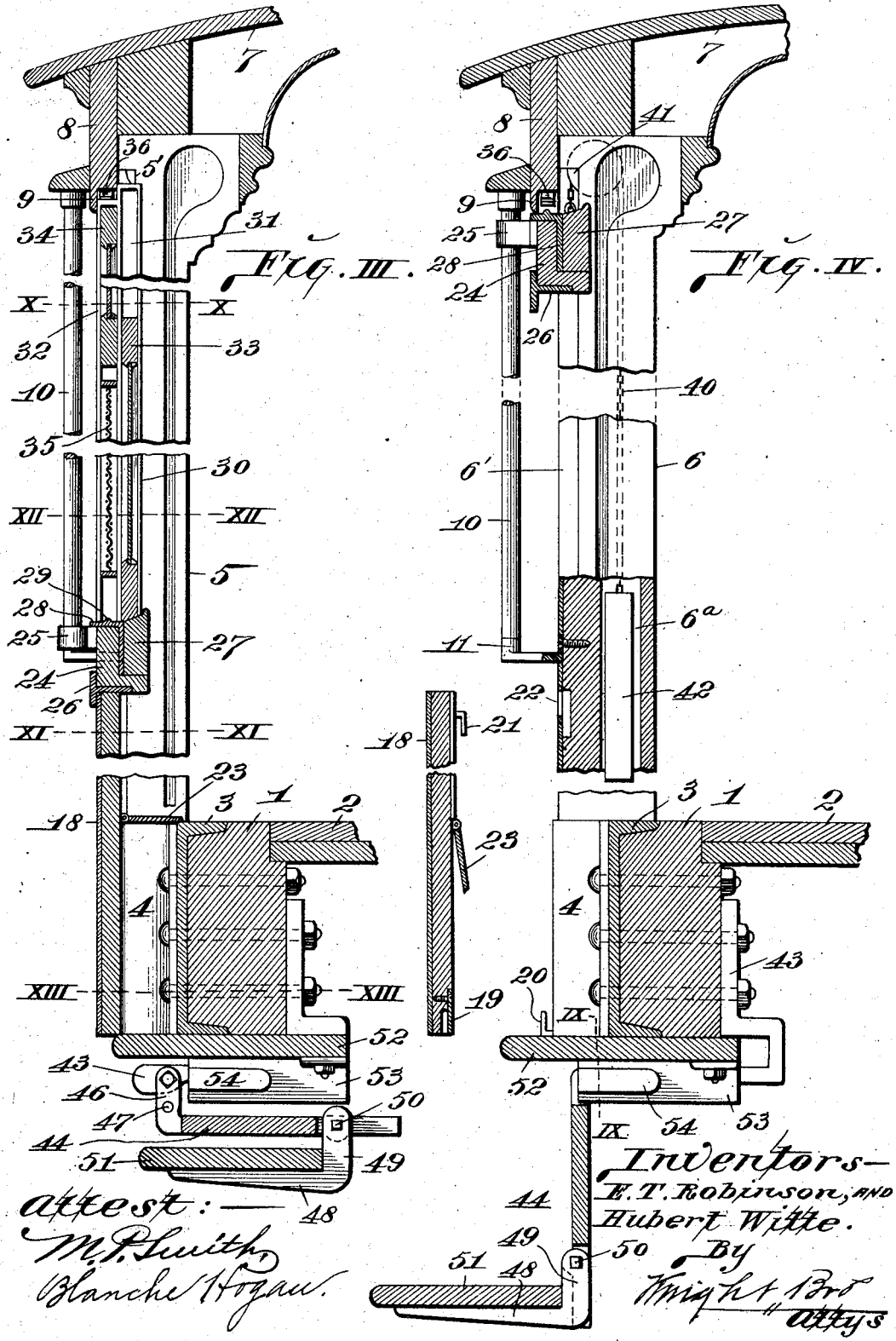

No. 790,592. PATENTED MAY 23, 1905.
E. T. ROBINSON & H. WITTE.
CONVERTIBLE CAR.
APPLICATION FILED JAN. 3, 1905.
11 SHEETS—SHEET 4.
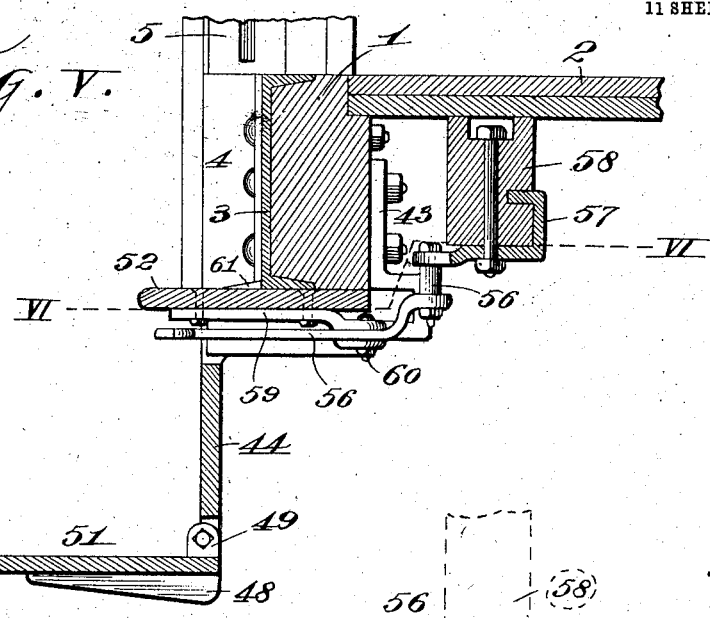
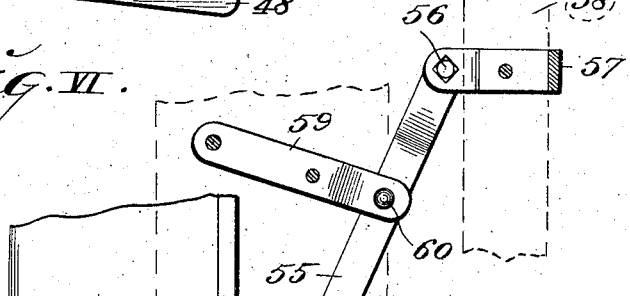
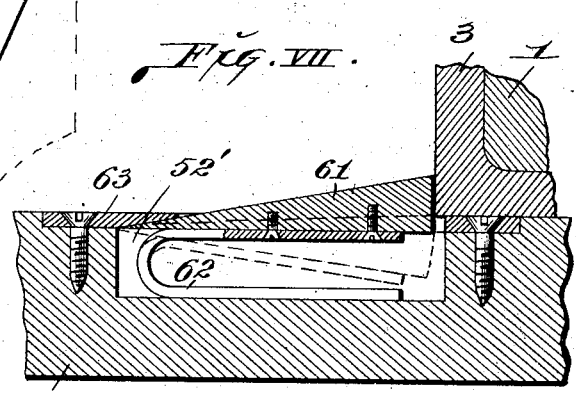

No. 790,592. PATENTED MAY 23, 1905.
E. T. ROBINSON & H. WITTE.
CONVERTIBLE CAR.
APPLICATION FILED JAN. 3, 1905.
11 SHEETS—SHEET 5.
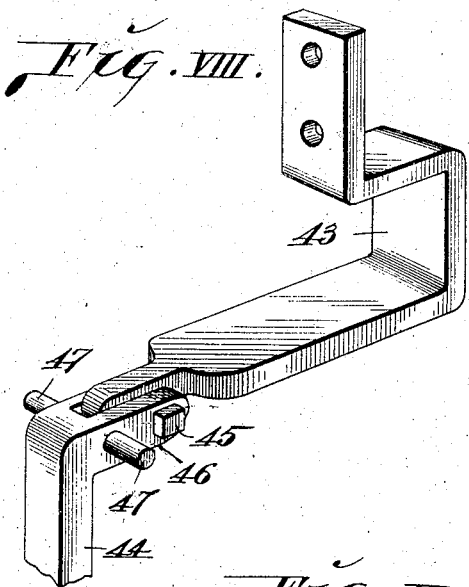
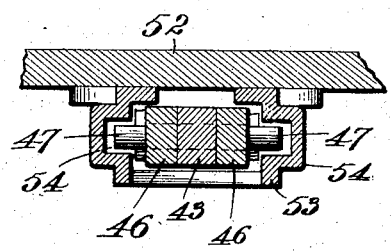
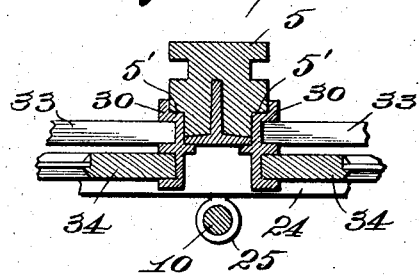
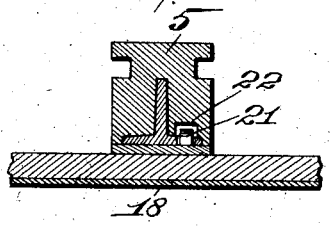
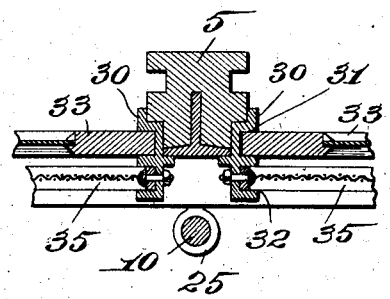
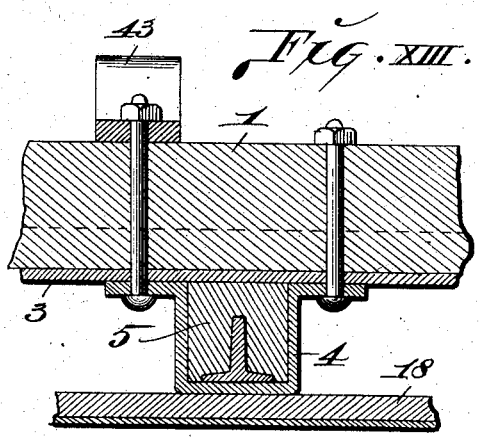
Attest:—
M. P. Smith,
Blanche Hogan.
Inventors,
E. T. Robinson and
Hubert Witte.
By Knight Bro
attys.

No. 790,592. PATENTED MAY 23, 1905.
E. T. ROBINSON & H. WITTE.
CONVERTIBLE CAR.
APPLICATION FILED JAN. 3, 1905.
11 SHEETS—SHEET 6.
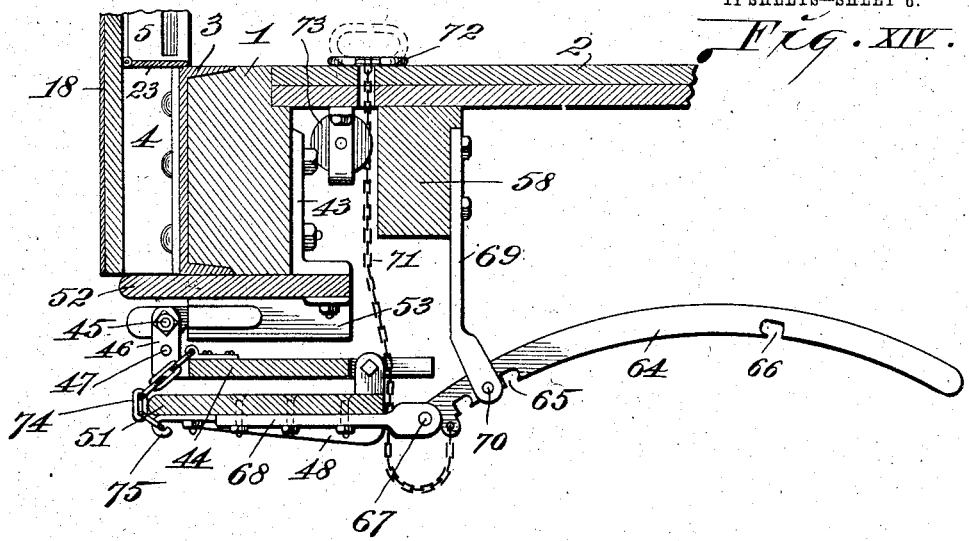
Fig. XIV.
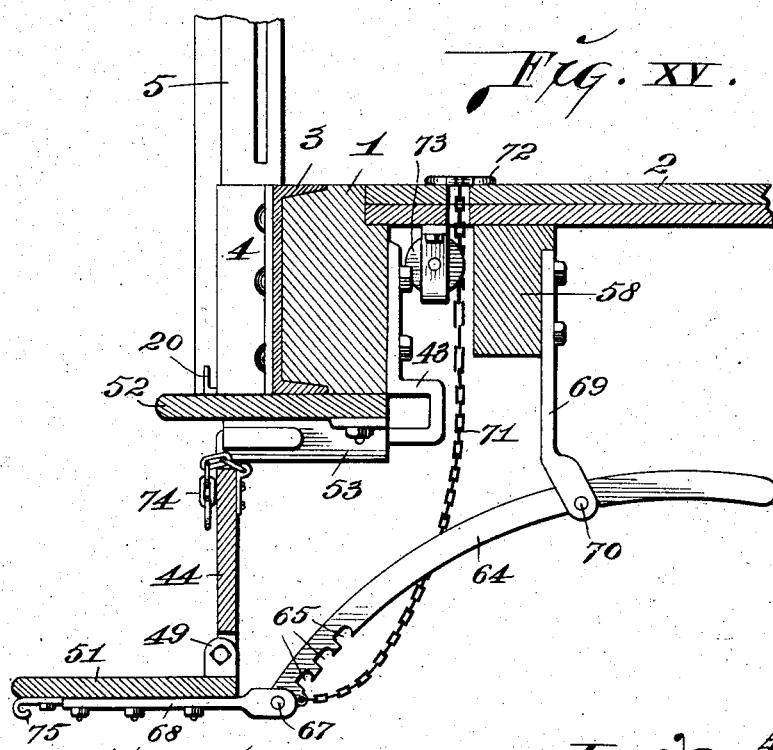
Fig. XV.
Attest:—
M. J. Smith
Blanche Hogan
Inventors—
E. T. Robinson and
Hubert Witte.
By Knight Bros.
Attys.

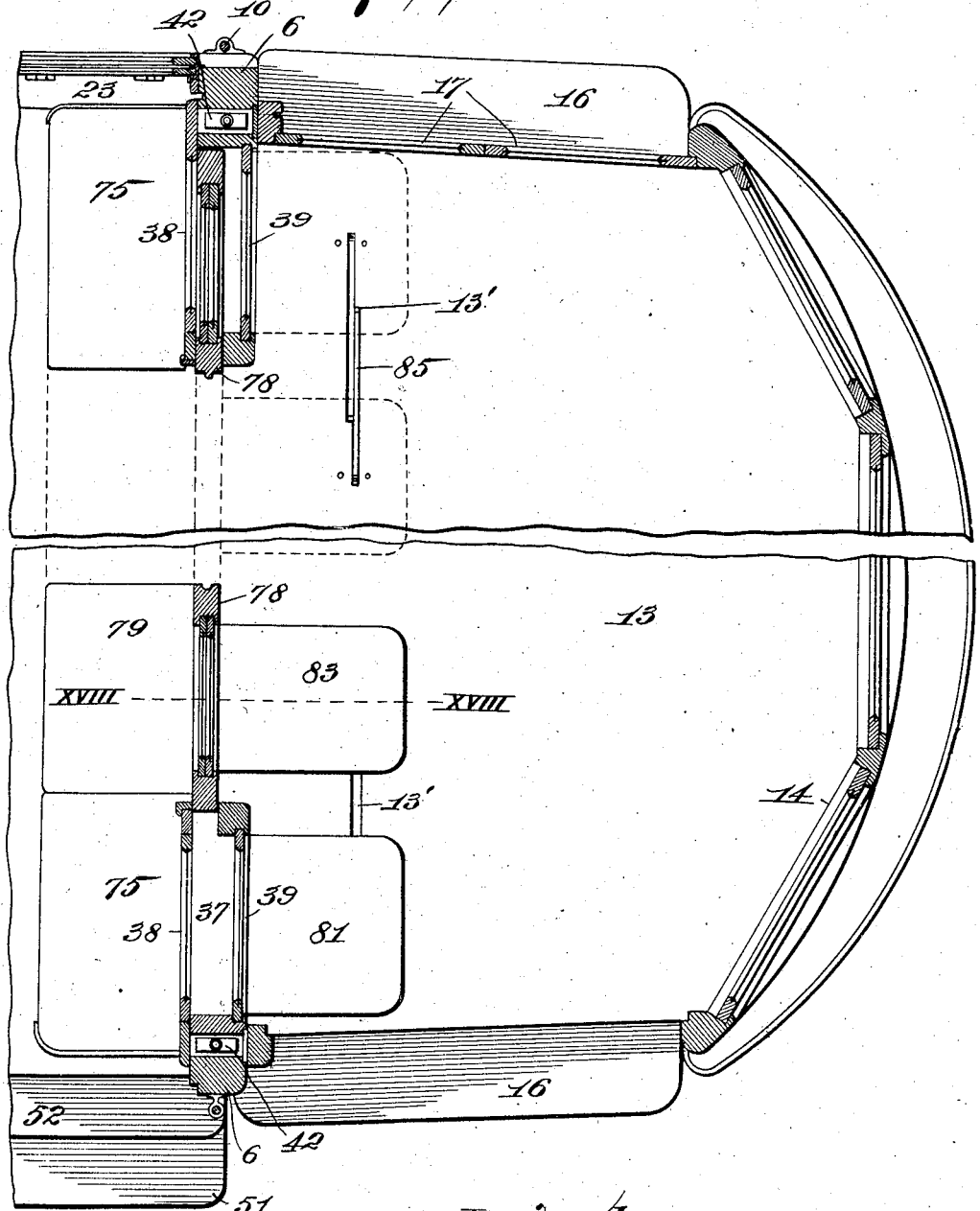

No. 790,592. PATENTED MAY 23, 1905.
E. T. ROBINSON & H. WITTE.
CONVERTIBLE CAR.
APPLICATION FILED JAN. 3, 1905.
11 SHEETS—SHEET 8.
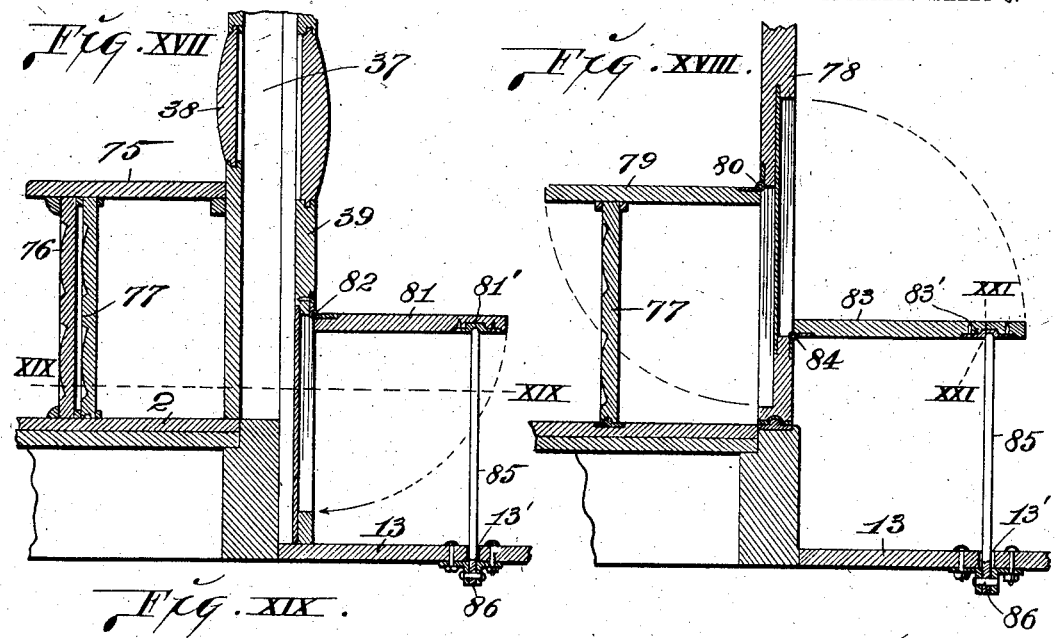
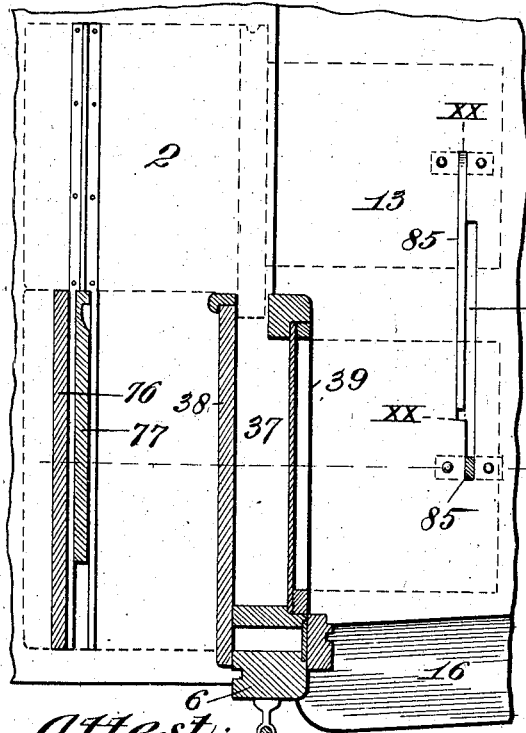
Attest:
M. P. Smith
Blanche Hogan
Inventors:—
E. T. Robinson, and
Hubert Witte.
By Knight Bro
Attys.

No. 790,592. PATENTED MAY 23, 1905.
E. T. ROBINSON & H. WITTE.
CONVERTIBLE CAR.
APPLICATION FILED JAN. 3, 1905.
11 SHEETS—SHEET 9.
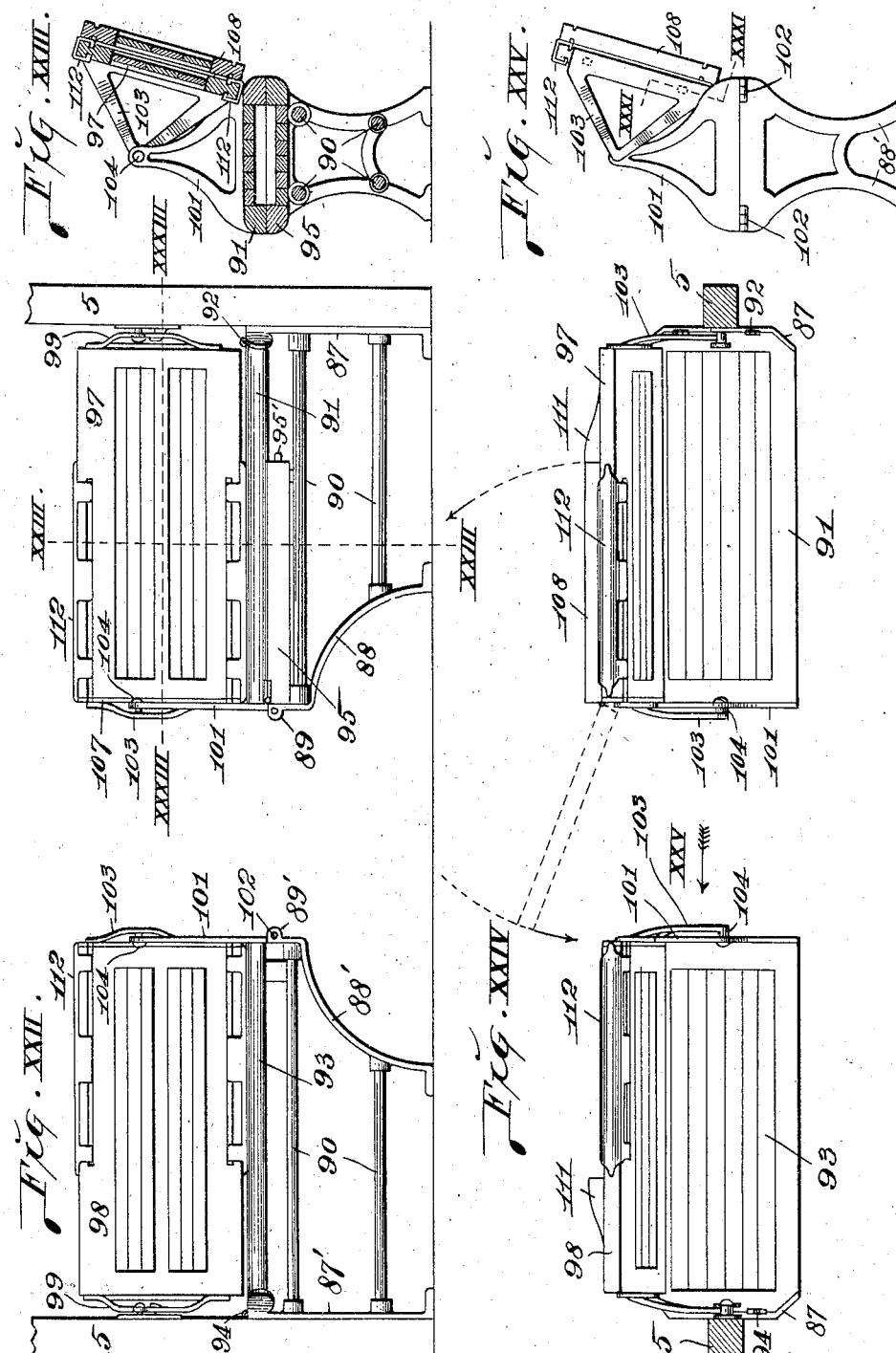
Attest:
M. P. Smith
Blanche Hogan
Inventors:
E. T. Robinson and Hubert Witte.
By Knight Bro.
attys.

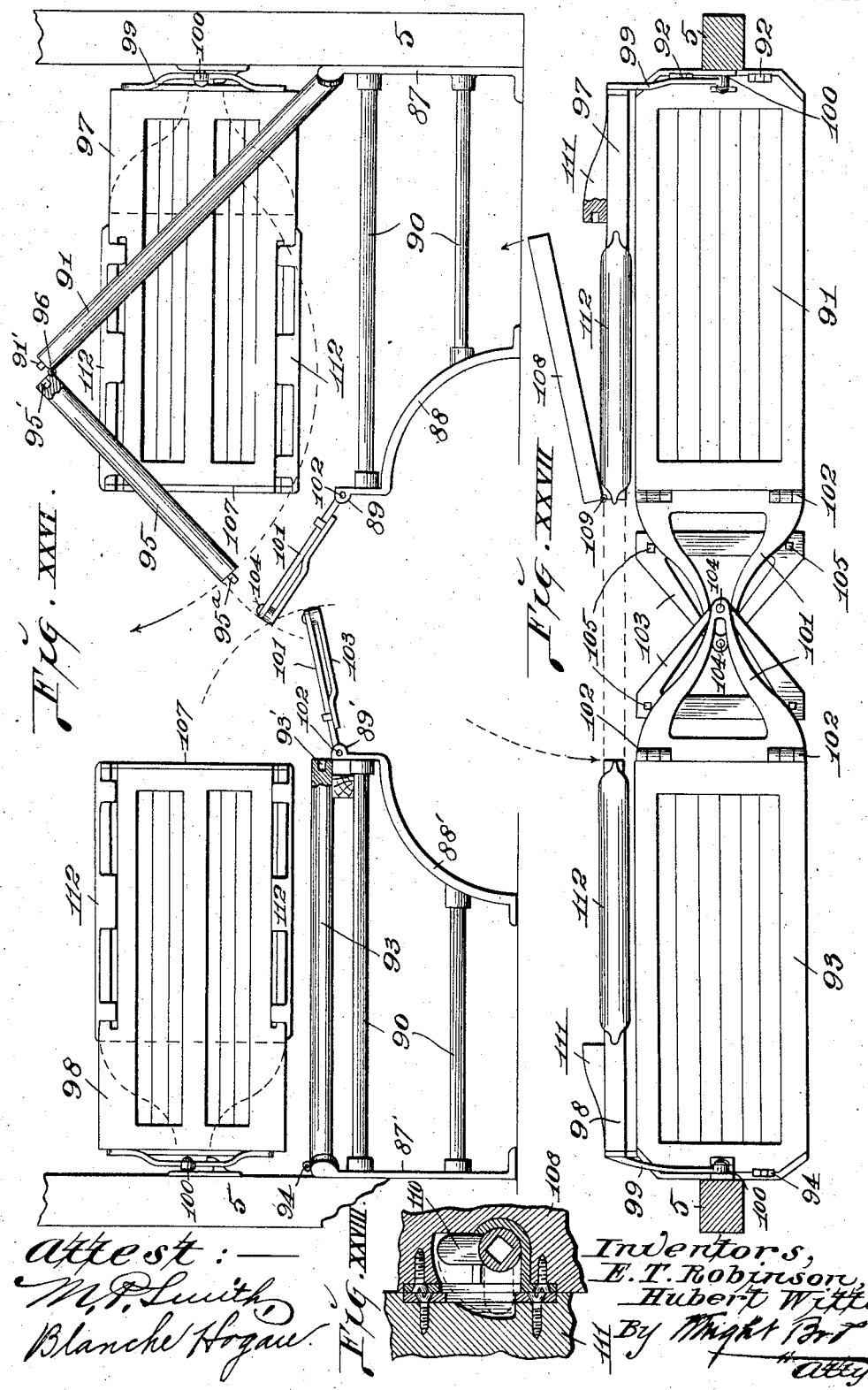

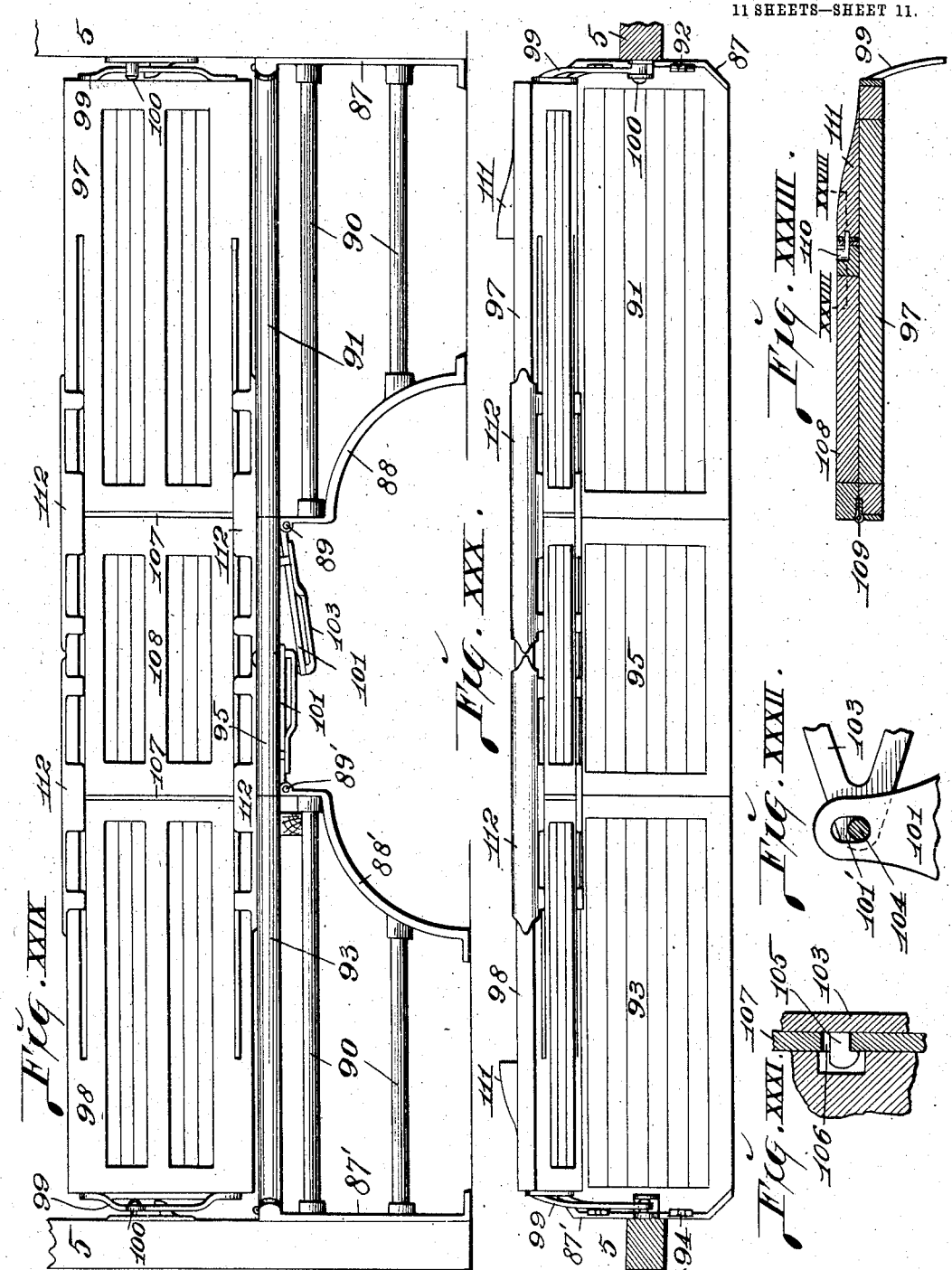

No. 790,592.  
Patented May 23, 1905.

UNITED STATES PATENT OFFICE.

EDWARD T. ROBINSON AND HUBERT WITTE, OF ST. LOUIS, MISSOURI, ASSIGNORS TO ST. LOUIS CAR COMPANY, OF ST. LOUIS, MISSOURI, A CORPORATION.

CONVERTIBLE CAR.

SPECIFICATION forming part of Letters Patent No. 790,592, dated May 23, 1905.

Application filed January 3, 1905. Serial No. 239,522.

*To all whom it may concern:*

Be it known that we, EDWARD T. ROBINSON and HUBERT WITTE, citizens of the United States, residing in the city of St. Louis and State of Missouri, have invented certain new and useful Improvements in Convertible Cars, of which the following is a full, clear, and exact description, reference being had to the accompanying drawings, forming part of this specification.

Our invention relates to a convertible car so constructed as to be susceptible of changing from a closed or winter car to an open or summer car, and vice versa, the construction being such that all of the features common to a closed car are present therein when the parts are all assembled and when certain parts are removed all of the features commonly present in an open car are present without the addition of parts not present in a car when in its closed form.

Figure I is a side elevation of one end of our car in closed condition. Fig. II is a side elevation of one end of our car in open condition. Fig. III is an enlarged vertical section through one side of our car in closed condition, partly broken out. Fig. IV is an enlarged vertical section through one side of our car in open condition, partly broken out. Fig. V is an enlarged vertical section through a portion of the floor of the car at one side and the running-boards in extended position. Fig. VI is a horizontal section taken on the irregular line VI VI, Fig. V, with parts beneath said line in plan view. Fig. VII is an enlarged vertical section taken through a portion of the upper running-board above the lower running-board in extended position and through the retaining-catch associated with said upper running-board. Fig. VIII is an enlarged perspective view of one of the hanger-brackets and the upper end of one of the pivoted hangers by which the running-boards are supported. Fig. IX is an enlarged vertical cross-section taken on line IX IX, Fig. IV. Fig. X is an enlarged horizontal cross-section taken on line X X, Fig. III. Fig. XI is an enlarged horizontal cross-section taken on line XI XI, Fig. III. Fig. XII is an enlarged horizontal cross-section taken on line XII XII, Fig. III. Fig. XIII is an enlarged horizontal cross-section taken on line XIII XIII, Fig. III. Fig. XIV is an enlarged vertical cross-section taken through the bottom of the car at one side, showing the running-boards in retracted position and the means for supporting the running-boards. Fig. XV is a similar view to Fig. XIV, showing the running-board in lowered position. Fig. XVI is a horizontal section taken through one end of the car, including the vestibule and the adjacent end wall, illustrating one side of the car closed and the other open. Fig. XVII is an enlarged vertical cross-section taken through one end wall of the car and the seats at the inner side and vestibule side of said wall. Fig. XVIII is an enlarged vertical section taken on line XVIII XVIII, Fig. XVI. Fig. XIX is a horizontal section taken on line XIX XIX, Fig. XVII, with parts beneath said line shown in plan view. Fig. XX is a vertical section taken on line X X, Fig. XIX, through a portion of the vestibule-floor with one of the swinging seat-supports in lowered position. Fig. XXI is an enlarged vertical section taken on line XXI XXI, Fig. XVIII, showing the upper end of one of the swinging seat-supports resting in the socket of the seat supported thereby. Fig. XXII is an elevation of a mating pair of the car-seats in condition for closed-car service. Fig. XXIII is a vertical cross-section taken on line XXIII XXIII, Fig. XXII. Fig. XXIV is a top or plan view of the seats as shown in Fig. XXII. Fig. XXV is an end view of one of the seats as seen in Fig. XXIV. Fig. XXVI is an elevation of a mating pair of the seats of the car with portions thereof disconnected and in the positions assumed when the seats are being transformed from condition for closed-car use to condition for open-car use. Fig. XXVII is a top or plan view of the seats shown in Fig. XXVI with the bottoms of the seats completely lowered and the intermediate portion of the seat-back partly swung toward connecting position. Fig. XXVIII is an enlarged section taken on line XXVIII XXVIII, Fig. XXXIII, through the latch by which the intermediate seat-back members are held in folded and unfolded positions. Fig. XXIX is an elevation of a mating pair of seats connected for open-car service. Fig. XXX is a top or plan view of the seats shown in Fig. XXIX. Fig. XXXI is an enlarged section taken on line XXXI XXXI, Fig. XXV. Fig. XXXII is a view illustrating in detail the connection between the drop-brackets that connect the backs to the bottoms of the seats. Fig. XXXIII is a longitudinal section taken on line XXXIII XXXIII, Fig. XXII.

The bottom of our car consists of the usual sills, including side sills 1, on which the flooring 2 is laid, as seen in Figs. III to V, inclusive, and XIV and XV. The outer sides of the side sills preferably have applied thereto channel-shaped facing-beams 3, and secured to the side sills are post-sockets 4.

5 designates intermediate side posts set into the pockets 4, and 6 (see particularly Figs. II, IV, and XVI) designates corner-posts that are also set into pockets similar to those in which the intermediate posts are seated. The posts 5 and 6 are each provided with sash-frame-receiving seats 5' and curtain-guide-ways 6'.

7 designates the roof of the car, which includes the fascia-boards 8, (see Figs. III and IV,) that are provided at their lower edges with downwardly-extending lips 9, the said fascia-boards overlapping the upper ends of the car side posts 5 and 6.

10 represents hand-rods secured to the posts 5 and 6 by brackets 11, in which the lower ends of the hand-rods are fitted and secured to the fascia-boards 8 by brackets 12, in which the upper ends of the rods are fitted.

13 designates the floors of the vestibules of the car, 14 the vestibule-fronts, and 15 the vestibule-hoods. The construction of the vestibules is that common to street-cars, and further description thereof is deemed unnecessary. Access is gained to the vestibules by steps 16, and the vestibule-doorways thereinto are controlled by the usual doors 17. (See Fig. I.)

We will first, in proceeding with the description of our car, set forth the body parts as they are applied in the service of the car in closed condition, in which instance access to the interior of the car is gained through the vestibules in the manner usual to closed cars.

18 designates the detachable outer panels of the car, which, as seen in Fig. IV, are provided at their lower edges with sockets that are adapted to receive upwardly-extending hooks 20, which project from the post-sockets 4, and also with hooks 21, located near their upper edges, adapted to enter sockets 22 in the side posts, whereby said panels are upheld at the sides of the car in a manner to permit of their ready removal when the hook-and-socket connections are separated. Each panel 18 has hinged thereto at its inner side a drop-door 23, (see Figs. III, IV, and XVI,) adapted to close the space existing between the panels and the car side sills intermediate of the side posts.

24 designates panel-rails that are loosely fitted to the hand-rods 10 by eyes 25, adapted to ride on said hand-rods. The panel-rails include flanged panel-retaining bars 26, located at the lower sides of the rails and engaging the panels 18 while said panel-rails are in their lowered condition, as seen in Figs. I and III. The panel-rails also include inner sash-frame rails 27 and outer sash-frame rails 28, the latter being provided with beads 29.

30 designates detachable sash-frames that are removably set into the sash-seats 5' and 6' of the car side posts and consisting of inner portions 31 and outer portions 32, adapted to respectively contain inner and lower liftable sashes 33 and outer and upper sashes 34 and window-guards 35. The lower end of the inner portion of each sash-frame rests upon the inner sash-frame rail 27, and the lower end of the outer portion of each sash-frame is notched to receive the beads 29 of the outer sash-frame rail, upon which said portion rests, thereby preventing outward movement of the lower ends of the sash-frames while they are supported by the panel-rail 24. The upper end of each sash-frame occupies a position at the rear of the fascia-board lip 9 adjacent thereto to prevent outward movement of the upper end of the frame. Each sash-frame is held depressed onto the panel-rail by a spring 36, located between the upper end of the sash-frame and the lower edge of the surrounding fascia-board 8 to maintain the sash-frame firmly in position and prevent its being jarred out of place.

37 (see Figs. XVI, XVII, and XIX) designates the end walls of the car, consisting of inner sections 38 and outer sections 39, spaced apart, as usual, for the reception of the end doors, which control the passage-ways between the interior of the car and its vestibules.

We will next proceed with the description of the parts of the car-body whereby the car is converted from a condition for closed service to a condition for open service.

The panel-rail 24 has connected to each of its ends a chain or other flexible connection 40, that leads over a sheave 41, mounted in the corner-posts 6, (see Figs. IV and XVI,) and to which are applied counterbalance-weights 42, that ride in runways $6^a$ in said corner-posts. These counterbalance-weights serve as a means for elevating the panel-rails from the positions seen in Figs. I and III to the position seen in Figs. II and IV and maintain them in such position at the upper ends of the side posts and the hand-rods, to which they are slidably fitted by the eyes 25. Where desirable, any suitable retaining means, such as a bolt or lock, may be applied to the panel-rails to retain them more securely in their elevated condition. In converting the car from a closed condition to an open condition the sash-frames 31 are first lifted out of their seats by raising them to permit disengagement of their lower ends with the panel-rail and then swinging their lower ends outwardly, when they may be readily withdrawn. The panel-rails now being freed by the removal of the sash-frames may be moved into elevated condition, as described, thereby freeing the panels 18. The panels 18 may be then readily lifted and withdrawn from the side posts by the separation of the hooks 20 and 21 from the sockets 19 and 22, in which they were previously fitted, thereby leaving clear passenger passage-ways between the car side posts, as will be readily understood.

43 (see Figs. II and V, inclusive, VIII, XIV, and XV) designates hanger-brackets secured to the rear side of the sills 1 at intervals and having arms extending outwardly beneath said sills.

44 represents drop-hangers having their upper ends bifurcated and pivoted at 45 to the terminations of the arms of the hanger-brackets 43. The drop-hangers are of angular shape at their upper ends, providing connecting-arms 46, that are the portions united to the bracket-arms and from which project lateral studs 47.

48 represents bench members having bifurcated arms 49, that are pivoted at 50 to the drop-hangers 44 above the lower ends, so that the arms 49 of the bench members may rest against and be sustained by the drop-hangers, as seen most clearly in Fig. IV, when they are in lowered condition.

51 represents lower running-boards which are seated upon and secured to the bench members 48 and are adapted to swing with said bench members when they are moved into folded or unfolded positions.

52 designates upper running-boards that are slidably positioned between the side sills 1 and the arms of the hanger-brackets 43.

53 represents boxes secured to the lower sides of the upper running-boards and slidably fitted to the forwardly-extending arms of the hanger-brackets 43. These boxes are provided at their sides with runway extensions 54, that are adapted to receive the studs 47, carried by the drop-hanger arms 46.

In Figs. V and VI we have illustrated means whereby the upper running-board 52 is slid inwardly and outwardly beneath the side sills 1, during which movement the boxes 53 move inwardly and outwardly with the forwardly-extending arms of the hanger-brackets 43 within them. This means consists of hand-levers 55, pivotally supported at 56 by brackets 57, secured to the hanger-timbers 58, located beneath the car-flooring. There are, preferably, two of these levers, one located near each end of the upper running-board.

59 represents straps secured to the upper running-boards and pivotally connected at 60 to the hand-levers 55.

It will be seen that when the hand-levers are moved to and fro they act upon the straps 59 and carry the running-boards inwardly or outwardly beneath the car side sills to retract them from extended position when the car is to be used in closed condition or to shift them outwardly into extended position when the car is to be used in open condition.

For the pupose of holding the upper running-boards in extended condition we provide latches 61, (see Fig. VII,) that are adapted to engage the facings of the side sills when the running-boards are extended. These latches are located in pockets 52' in the upper running-boards and are carried by springs 62, that tend to force the latches upwardly, but which permit the receding of the latches into said pockets when the running-boards are to be moved into retracted positions.

63 is a confining-plate secured to the upper running-board at the location of each latch 61 and overlapping the outer end of the latch to prevent the escape of such end from the latch-pocket.

When the upper running-boards are in retracted positions, as seen in Figs. I, III, and XIV, the lower running-boards are folded upwardly beneath the upper running-boards, being susceptible of being moved into such position due to the pivotal connection between the drop-hangers 44 and the arms of the hanger-brackets 43 and the pivotal connection between the bench members of the lower running-boards and the drop-hangers. Previous to moving the upper running-board into extended position in placing the running-boards in condition for open-car service each lower running-board is freed from the means by which it is upheld, and which will be presently described, and permitted to fall from the position seen most clearly in Figs. II, III, and XIV, thereby causing the drop-hangers to move into vertical positions and the lower running-boards to assume horizontal positions. When the drop-hangers move into the positions just stated, their arms 46 extend horizontally and in alinement with the forwardly-extending arms of the hanger-brackets 43, to which they are pivoted, and the studs 46, extending laterally from said drop-hanger arms, are in horizontal alinement with the runways in the box extensions 54 beneath the upper running-boards. The upper running-boards are then moved into extended position by operating the hand-levers 55, and as said running-boards move outwardly the boxes 53 are carried in like direction toward the forward ends of the hanger-bracket arms therein, with the result that the boxes embrace the studs 47 of the drop-hanger arms, as seen most clearly in Fig. IX, thereby preventing swinging movement of the drop-hangers.

64 (see Figs. XIV and XV) designates keeper-bars by which the lower running-boards and their drop-hangers are held from swaying movement both when the running-boards are in folded and unfolded positions. The forward ends of these keeper-bars, which may be of any desirable number, are pivoted at 67 to straps 68, secured to the lower running-boards. 69 represents brackets suspended from the timbers 58 beneath the car-flooring and provided with pins 70, with which said keeper-bars are adapted to engage. Each keeper-bar is provided near its forward end with one or more notches 65, into which the corresponding pin 70 is adapted to enter when the lower running-board is in folded position, as seen in Fig. XIV. Each keeper-bar is also provided at a point rearward from the notch or notches 65 with a notch 66, that is adapted to receive the pin 70 when the lower running-board is in unfolded and lowered position, as seen in Fig. XV.

71 designates pull-chains of a number corresponding to the number of keeper-bars 64. These pull-chains are connected to the keeper-bars adjacent to the points 67 of pivotal connection at their forward ends, and they extend upwardly through the flooring 2 and have applied thereto handles 72, by which they may be drawn upon. Each pull-chain extends upwardly adjacent to a sheave 73, against which it rides when pulling strain is exerted thereupon.

74 represents connecting-chains that are secured to the drop-hangers 44 at the upper ends and are arranged for engagement with hooks 75, carried by the lower running-boards, to support the running-boards at their forward edges when they are in folded condition.

Previous to the lowering of each lower running-board from folded to unfolded condition the connecting-chains 74 are separated from the hooks 75. The pull-chains 71 are then grasped and pulled upwardly, and the keeper-bars 64 are lifted out of engagement with the pins of the brackets 69. The lower running-board is then permitted to descend, and the keeper-bars ride upon the pins 70 until the notches 66 are moved to said pins, at which time the keeper-bars are again placed in engagement with the brackets 69, so that said brackets serve to hold the keeper-bars, and consequently the lower running-boards, until such time as the pull-chains are again drawn upon to lift the keeper-bars and carry the lower running-board again into folded condition.

We next come to the description of the seats at the ends of our car, which are illustrated in Figs. XVI to XXI, inclusive, and shown in part in Fig. II.

75 designates permanent seats located adjacent to the inner sections 38 of the end walls, each seat being supported by a riser 76. (See Figs. XVII and XIX.) Slidably positioned beneath the seats 75 are shiftable risers 77. The seats 75 are susceptible of use in both closed and open car service.

78 represents the end doors, that are adapted to slide as usual into position between the sections 38 and 39 when the car is used for closed service. When the car is used for open service, the doors are closed and maintained in such condition.

79 represents seats having their upper ends hinged at 80 to the doors 78 at their inner sides and beneath which the shiftable risers 77 are adapted to be moved to support said seats, as seen in Figs. XVI and XVIII. When the seats 79 are in service, they are in horizontal alinement with the permanent seats 75 and a continuous seating-surface is furnished across the width of the car at the inner side of each end of the car.

81 (see Figs. XVI and XVII) represents seats having their upper ends hinged to the outer sections 39 of the car end walls at 82 and adapted to be swung upwardly into horizontal positions in the vestibule portions of the car, and 83 represents seats having their lower ends hinged to the end doors 78, adapted to be lowered into horizontal position in the vestibule, as seen in Figs. XVI and XVIII. The seats 81 and 83 are supported in their horizontal positions by swinging posts 85, which are pivoted to brackets 86, secured to the floors 13 of the vestibules, and are adapted to be raised into upright positions to seat in sockets 81' and 83' in the under sides of the seats. When the posts 85 are not in use, they occupy slots 13' in the floors of the vestibules.

We will next describe the main seats of the car, which are so constructed as to permit of their conversion into main separate seats with an aisle extending longitudinally of the car between them when the car is in condition for closed-car service and also susceptible of being made continuous across the car when converted into condition for open-car service.

87 and 87' designate outer main sides that are secured to the car side posts 5, as seen in Figs. XXII, XXIV, XXVI, XXVII, XXIX, and XXX.

88 and 88' are inner seat sides that are united to the outer seat sides by brace-rods 90. At the upper ends of the inner seat sides are hinge-ears 89 and 89'.

91 and 93 are the main seat-bottoms, the bottoms 91 being swingingly secured by hinges 92 at their outer ends to the outer seat sides 87 and the bottoms 93 being swingingly secured to the outer seat sides 87' by hinges 94.

95 represents supplemental seat-bottom sections, which are swingingly connected to the seat-bottoms 91 by hinges 96, located at the lower sides of said members, as seen in Fig. XXVI, thereby providing for the folding of said supplemental bottom sections into positions beneath the seat-bottoms 91, as seen in Figs. XXII and XXIII, when the transversely-alined seats are in separated condition in closed-car service. The supplemental seat-bottom sections are designed to be extended into horizontal alinement with the main seat-bottoms 91 and 93 to furnish a continuous seating-surface across the entire width of the car. To provide for the last-named positioning of the supplemental sections the seat-bottoms 91 are swung upwardly on their hinges 92, as seen in Fig. XXVI, thereby permitting of the supplemental sections being swung outwardly from beneath said main seat-bottoms and lowered to positions across the aisle-space between the inner seat ends, as seen in Figs. XXIX and XXX. When the supplemental seat-bottom sections are moved into their extended positions, tenons 91' at the inner ends of the main seat-bottoms 91 enter sockets 95' in the facing ends of the supplemental sections and tenons 95ª at the other ends of the supplemental sections enter sockets 93' in the main seat-bottoms 93.

97 and 98 designate the main seat-backs.

99 represents outer swinging arms secured to the main seat-backs and by which said backs are swingingly connected through the medium of pivot-brackets 100, secured to the car side posts 5 above the main seat-bottoms.

101 represents swinging brackets at the inner ends of the main seats which are hinged at 102 to the ears 89 and 89' of the inner seat ends so as to be susceptible of assuming upright positions at the inner ends of the main seats, as seen in Figs. XXII to XXV, inclusive, and XXXII, or of being lowered across the aisle-space between said main seats, as seen in Figs. XXVI, XXVII, and XXIX.

103 represents inner back-connecting arms which are provided with pivot-studs 104, by which they are swingingly connected with the inner end brackets 101, so that they may partake of swinging movement with respect to said end brackets. The pivot-studs 104 are seated in vertical elongated apertures 101' (see Fig. XXXII) in the end brackets 101, so that when the back-connecting arms and the end brackets are in vertical position the back-connecting arms may be susceptible of a rise-and-fall motion. Each inner back-connecting arm is provided with hooks 105, adapted to enter sockets 106 in end strips 107, as seen in Figs. XXV and XXXI, the said end strips being fitted to the inner ends of the main seat-backs 97 and 98. The inner back-connecting arms 103 are thereby rendered susceptible of being connected to the main seat-backs when the end brackets 101 and the inner back-connecting arms are in vertical position and the main seats are in separated condition the back-connecting arms being readily fitted to the main seat-backs by entering the hooks 105 into the sockets 106 and forcing them downwardly therein, which movement is permitted due to the play of the pivot-studs 104 in the end brackets 101. The construction described also provides for the disconnection of the end seat-arms 103 from the main seat-backs and the swinging of said connecting-arms into positions in alinement with the end seat-brackets 101, so that said parts may be lowered into the positions seen in Figs. XXVI and XXVII previous to the extensions of the supplemental seat-bottom sections 95 across the aisle-space between the main seats to furnish the continuous transverse seats.

108 designates supplemental seat-back sections that are swingingly connected by hinges 109 to one of each of the mating pairs of the main seat-backs—for instance, those 97. These supplemental seat-back sections by reason of their swinging connections are rendered susceptible of being swung, as indicated in Fig. XXVII, from positions at the rear of the back sections to which they are connected to positions across the aisle-space between the main seats to constitute the intervening back portions of the continuous transverse seats at the location of the supplemental seat-bottom sections 95 when in extended condition. In the free end of the supplemental back-sections 108 are latches 110. (See Figs. XXVIII and XXXIII.) These latches are designed to enter keepers 111 at the rear of the main back-sections of the seats to which the supplemental back-sections 108 are connected and serve to hold said back-section in folded condition, as seen in Figs. XXIII to XXV, inclusive, and XXXIII, when the main seats are in separated condition in their use in closed-car service. The latches 110 are also adapted to engage with the main seat-back sections to which the supplemental sections 108 are swung when the seats are rendered continuous.

112 represents slidable retainers loosely fitted to the main seat-backs 97 and 98 at their upper and lower edges, the said retainers being provided with tongues that ride in runways in said sections and are also adapted to ride in runways in the supplemental back-sections 10'. When the supplemental back-sections are in extended positions to unite the main back-sections, the retainers are slid inwardly toward each other into the positions seen in Figs. XXIX and XXX, so that they overlap the joints between the main back-sections and the supplemental back-sections, where they serve to brace the sections together and resist any strain to which the continuous seat-backs may be subjected.

It will be seen that when the seat-backs are made continuous they may be readily swung into reverse positions in entirety, due to their points of pivotal connection being at the outer ends of the main seat-back sections, with the same readiness as when the main seats are in separated condition and the inner brackets and inner back-connecting arms are associated with the main seat-back sections.

We claim as our invention—

1. In a convertible car, the combination of a side framework, a panel detachably fitted to said framework, and a shiftable panel-rail supported by said framework and adapted to hold said panel to the framework, substantially as set forth.

2. In a convertible car, the combination of a side framework, a panel detachably fitted to said framework, and a vertically-movable panel-rail fitted to said framework and arranged to hold said panel, substantially as set forth.

3. In a convertible car, the combination of a side framework, a panel detachably fitted to said framework, a shiftable panel-rail fitted to said framework to hold said panel, and detachable sash-frames fitted in said framework, substantially as set forth.

4. In a convertible car, the combination of a side framework, a panel detachably fitted to said framework, a shiftable panel-rail fitted to said framework to hold said panel, detachable sash-frames fitted in said framework, and means for confining said sash-frames between said panel-rail and a portion of the framework surmounting them, substantially as set forth.

5. In a convertible car, the combination of side posts, a panel detachably fitted to said side posts, hand-rods secured to said side posts, and a panel-rail slidably fitted to said hand-posts, substantially as set forth.

6. In a convertible car, the combination of side posts, a panel detachably fitted to said side posts, hand-rods attached to said side posts, a panel-rail for engagement with said panels, and ears carried by said panel-rail and slidably fitted to said hand-rods, substantially as set forth.

7. In a convertible car, the combination of a side framework, a panel detachably fitted to said framework for engagement with the panel-rail, and counterbalances connected to said panel-rail, substantially as set forth.

8. In a convertible car, the combination of a side framework including side and corner posts, the latter of which are provided with runways, a panel detachably fitted to said posts, a panel-rail slidably fitted to said posts, and counterbalances connected to said panel-rail and arranged to operate in the runways in said corner-posts, substantially as set forth.

9. In a convertible car, the combination of a side framework, a panel detachably fitted to said framework, a panel-rail slidably fitted to said framework for engagement with said panel, sash-frames removably fitted between members of said framework and resting upon said panel-rail, and springs associated with said sash-frames to hold them in position upon said panel-rail, substantially as set forth.

10. In a convertible car, the combination of a framework including side posts and a fascia-board located at the upper ends of said side posts, a panel-rail detachably fitted to said side posts, a panel-rail slidably fitted to said posts, sash-frames removably fitted between said side posts and resting upon and having engagement with said panel-rail, and springs located between the upper ends of said sash-frames and the surmounting fascia-board, substantially as set forth.

11. In a convertible car, the combination of a side framework, a panel detachably fitted to said framework, a panel-rail slidably fitted to said framework, and a flange-bar located at the lower side of said panel-rail for engagement with said panel to hold it to said framework, substantially as set forth.

12. In a convertible car, the combination of the framework including a side sill and side posts, a panel detachably fitted to said side posts, and doors carried by said panel and adapted to occupy the space between said side sill and panel intermediate of said posts, substantially as set forth.

13. In a convertible car, the combination with the bottom side members of the car, of a laterally-shiftable upper running-board, means for moving said upper running-board outwardly and inwardly beneath said frame member, a lower running-board, and means whereby said lower running-board is foldingly supported, substantially as set forth.

14. In a convertible car, the combination with the bottom side members of the car, of an upper running-board shiftably mounted beneath said frame members, brackets secured to one of said frame members and extending beneath said upper running-board, drop-hangers pivoted to said brackets, and a lower running-board pivotally connected to said drop-hangers, substantially as set forth.

15. In a convertible car, the combination with the bottom side members of the car, of an upper running-board shiftably mounted, brackets secured to a lower frame member of the car, drop-hangers pivoted to said brackets, a lower running-board supported by said drop-hangers, and boxes secured to the under side of said upper running-board and arranged for engagement with said drop-hangers, substantially as set forth.

16. In a convertible car, the combination with the bottom side members of the car, of an upper shiftably-mounted running-board, brackets secured to a lower member of the car-frame, drop-hangers pivoted to said brackets and provided at their upper ends with studs, a lower running-board supported by said drop-hangers, and boxes secured to the lower sides of said upper running-board and arranged to engage the studs of said drop-hangers, substantially as set forth.

17. In a convertible car, the combination with the bottom side members of the car, of an upper running-board shiftably mounted beneath said frame members, brackets secured to a lower frame member and extending forwardly beneath said upper running-board, drop-hangers pivoted to said brackets and provided at their upper ends with studs, a lower running-board having pivotal connection with said drop-hangers, and members secured to the lower side of said upper running-board and arranged to move into engagement with said drop-hanger studs when said upper running-board is moved outwardly, substantially as set forth.

18. In a convertible car, the combination with the bottom side members of the car, of an upper running-board shiftably mounted beneath a lower frame member, and hand-levers connected to pivot-supports and having pivotal connection to said running-board whereby said running-board may be shifted outwardly and inwardly, substantially as set forth.

19. In a convertible car, the combination with the bottom side members of the car, of an upper running-board shiftably positioned beneath a lower frame member, and latches seated in said running-board and arranged to engage said frame member when said running-board is moved outwardly, substantially as set forth.

20. In a convertible car, the combination with the bottom side members of the car, of a running-board, means whereby said running-board is swingingly suspended from the car-frame, notched keeper-bars connected to said running-board, and means carried by the car with which said keeper-bars engage to hold said running-board and its suspending means in folded and unfolded positions, substantially as set forth.

21. In a convertible car, the combination with the bottom side members of the car, of a running-board, hangers pivotally suspended from a lower frame member and pivotally connected to said running-board to permit of said running-board and hangers being moved into folded and unfolded positions, keeper-bars connected to said running-board, and means with which said keeper-bars engage to hold them in fixed positions, substantially as set forth.

22. In a convertible car, the combination with the bottom side members of the car, of a running-board, hangers pivotally suspended from a lower frame member and pivotally connected to said running-board to permit of said running-board and hangers being moved into folded and unfolded positions, keeper-bars connected to said running-board, means with which said keeper-bars engage to hold them in fixed positions, and means for moving said keeper-bars out of engagement with said holding means to permit of said running-board being moved into folded and unfolded positions, substantially as set forth.

23. In a convertible car, the combination with an end wall of the car containing a doorway and a door shiftably mounted to control said doorway, of a seat hinged to said door, and means for supporting said seat in horizontal position.

24. In a convertible car, the combination with an end wall of the car containing a doorway and a door shiftably mounted to control said doorway, of a seat located at the inner side of said end wall, a riser shiftably positioned beneath said seat, and a seat hinged to said door and beneath which said shiftable riser is adapted to be moved, substantially as set forth.

25. A convertible car having a vestibule and an end wall separating the main portion of the car from said vestibule, a door controlling communication between the interior of the car and the vestibule, a seat hinged to said door at the vestibule side thereof, and a post swingingly secured to the vestibule-floor and arranged to be moved into upright position to support said seat in horizontal position, substantially as set forth.

26. A convertible car having a vestibule and an end wall separating the interior of the car from said vestibule, a seat at the vestibule side of said end wall, and a post swingingly secured to the vestibule-floor and arranged to be moved into upright position to support said seat in horizontal position.

27. In a convertible car, the combination of main seats spaced apart to furnish an aisle-space between them and having main-seat bottom sections, and a supplemental bottom section hinged to one of said main bottom sections and arranged to be extended across the aisle-space between said main seats into alinement with the other main-seat bottom section, substantially as set forth.

28. In a convertible car, the combination of main seats spaced apart to provide an aisle-space between them and having main-seat bottom sections hinged at their outer ends, and a supplemental bottom section hinged to one of said main-seat bottom sections and arranged to be extended across the aisle-space between said main seats to meet the bottom section of the opposing main seat, substantially as set forth.

29. In a convertible car, the combination of a pair of main seats having outer and inner supporting members and including main bottom sections, one of which is hinged to the corresponding outer supporting member, and a supplemental bottom section hinged to said hinged main bottom section and arranged to be extended to the bottom section of the opposing main seat, substantially as set forth.

30. In a convertible car, the combination of a pair of main seats spaced apart to provide an aisle-space between them and having main back sections, and a supplemental back section movably connected to one of said main back sections and arranged to be moved therefrom to the other main back section, substantially as set forth.

31. In a convertible car, the combination of a pair of main seats spaced apart to provide an aisle-space between them and having main back sections, a supplemental back section hinged to one of said main back sections and arranged to be extended to the other back section across said aisle-space, and means for securing said supplemental back section in its extended position.

32. In a convertible car, the combination of a pair of main seats spaced apart to provide an aisle-space between them and having main back sections, a supplemental back section hinged to one of said main back sections and arranged to be extended to the other back section across said aisle-space, and retaining members slidably fitted to said main back sections and arranged to be moved into positions across the junctions between said main back sections and supplemental back section, substantially as set forth.

33. In a convertible car, the combination of main seats spaced apart to provide an aisle-space between them and having main back sections, inner swinging end brackets and back connecting-arms pivoted to said brackets and detachably fitted to said main back sections, substantially as set forth.

34. In a convertible car, the combination of main seats spaced apart to provide an aisle-space between them and having inner supporting members and main back sections, inner end brackets hinged to said inner supporting members, and back connecting-arms pivoted to said brackets and detachably connected to said main back sections, substantially as set forth.

E. T. ROBINSON.
HUBERT WITTE.

In presence of—
H. F. VOGEL,
ARTHUR DIEKMANN.